(12) United States Patent     (10) Patent No.: US 12,161,095 B2
Holm et al.     (45) Date of Patent: Dec. 10, 2024

(54) TRANSFER ASSEMBLY AND SYSTEM FOR AQUACULTURE

(71) Applicant: Atlantic Sapphire IP, LLC, Homestead, FL (US)

(72) Inventors: Thue Holm, Vejle (DK); Johan E. Andreassen, Miami, FL (US)

(73) Assignee: ATLANTIC SAPPHIRE IP, LLC, Homestead, FL (US)

( * ) Notice: Subject to any disclaimer, the term of this patent is extended or adjusted under 35 U.S.C. 154(b) by 0 days.

(21) Appl. No.: 18/136,188

(22) Filed: Apr. 18, 2023

(65) Prior Publication Data

US 2023/0247971 A1     Aug. 10, 2023

Related U.S. Application Data

(63) Continuation-in-part of application No. 16/990,271, filed on Aug. 11, 2020, now Pat. No. 11,596,132, and
(Continued)

(51) Int. Cl.
*A01K 63/04*     (2006.01)
*A01K 63/00*     (2017.01)
(Continued)

(52) U.S. Cl.
CPC .......... *A01K 63/045* (2013.01); *A01K 63/006* (2013.01); *A01K 63/04* (2013.01);
(Continued)

(58) Field of Classification Search
CPC .... A01K 63/045; A01K 63/042; A01K 63/04; A01K 63/047; A01K 63/00;
(Continued)

(56) References Cited

U.S. PATENT DOCUMENTS 2,643,481 A    6/1953   Ederer
3,200,949 A    8/1965   Aulich
(Continued)

FOREIGN PATENT DOCUMENTS

CA    2711677    11/2012
CN    102329055   1/2012
(Continued)

OTHER PUBLICATIONS

Almeida et al., Almeida et al. (Antibiotics, 2019; 8: 192), Oct. 24, 2019.
(Continued)

*Primary Examiner* — Yvonne R Abbott-Lewis
(74) *Attorney, Agent, or Firm* — MALLOY & MALLOY, P.L.

(57) ABSTRACT

A system for transferring marine life within an aquaculture facility including a plurality of segregated storage facilities each containing water for marine life, maintained within a predetermined temperature range and supported at independent ground levels. The storage facilities are successively disposed and structured to contain marine life at different stages of growth. A transfer assembly includes a path of fluid flow interconnecting successive ones of said plurality of storage facilities in fluid communication with one another, wherein at least a majority of a length of said path of fluid flow is disposed beneath the independent ground levels at a predetermined depth, which is sufficient to facilitate maintenance of the path of fluid flow within the predetermined temperature range, via geothermal cooling. The transfer assembly may also connect a holding facility, which may be dimensioned and structured to transfer mature marine life, possibly on an on-demand basis, to the harvesting facility.

19 Claims, 3 Drawing Sheets

Related U.S. Application Data a continuation of application No. 16/990,597, filed on Aug. 11, 2020, now Pat. No. 11,627,729, said application No. 16/990,271 is a continuation-in-part of application No. 16/916,986, filed on Jun. 30, 2020, now Pat. No. 11,484,015, which is a continuation-in-part of application No. 15/867,100, filed on Jan. 10, 2018, now Pat. No. 10,034,461, which is a continuation of application No. 15/157,296, filed on May 17, 2016, now Pat. No. 10,694,722.

(60) Provisional application No. 63/014,387, filed on Apr. 23, 2020, provisional application No. 62/975,410, filed on Feb. 12, 2020, provisional application No. 62/165,144, filed on May 21, 2015.

(51) Int. Cl.
| | | |
|---|---|---|
| *B01D 21/01* | (2006.01) | |
| *B01D 21/24* | (2006.01) | |
| *C02F 1/32* | (2023.01) | |
| *C02F 3/30* | (2023.01) | |
| *C02F 9/00* | (2023.01) | |
| *C02F 1/00* | (2023.01) | |
| *C02F 1/66* | (2023.01) | |
| *C02F 3/04* | (2023.01) | |
| *C02F 3/08* | (2023.01) | |
| *C02F 11/123* | (2019.01) | |
| *C02F 11/14* | (2019.01) | |
| *C02F 101/10* | (2006.01) | |
| *C02F 101/16* | (2006.01) | |
| *C02F 103/20* | (2006.01) | |

(52) U.S. Cl.
CPC .......... *A01K 63/042* (2013.01); *A01K 63/047* (2013.01); *B01D 21/01* (2013.01); *B01D 21/2455* (2013.01); *C02F 1/325* (2013.01); *C02F 3/305* (2013.01); *C02F 9/00* (2013.01); *C02F 1/001* (2013.01); *C02F 1/32* (2013.01); *C02F 1/66* (2013.01); *C02F 3/04* (2013.01); *C02F 3/085* (2013.01); *C02F 11/123* (2013.01); *C02F 11/14* (2013.01); *C02F 2101/105* (2013.01); *C02F 2101/16* (2013.01); *C02F 2103/20* (2013.01); *C02F 2209/005* (2013.01); *C02F 2209/02* (2013.01); *C02F 2209/03* (2013.01); *C02F 2209/05* (2013.01); *C02F 2209/06* (2013.01); *C02F 2209/22* (2013.01); *C02F 2209/42* (2013.01); *C02F 2301/046* (2013.01); *C02F 2303/04* (2013.01); *C02F 2303/16* (2013.01)

(58) Field of Classification Search
CPC ...... A01K 63/006; A01K 61/00; A01K 61/10; B01D 21/01; C02F 2209/00; C02F 2301/046; C02F 1/001
USPC ....... 119/215, 200, 227, 226, 231, 259, 260, 119/211, 224, 230, 245, 261, 51.04
See application file for complete search history.

(56) References Cited

U.S. PATENT DOCUMENTS

| | | | |
|---|---|---|---|
| 3,771,492 A * | 11/1973 | Doherty | A01K 63/04 119/225 |
| 3,832,720 A | 8/1974 | Cook | |
| 4,009,782 A | 3/1977 | Grimshaw | |
| 4,052,960 A | 10/1977 | Birkbeck et al. | |
| 4,067,809 A | 1/1978 | Kato | |
| 4,141,318 A | 2/1979 | MacVane et al. | |
| 4,225,543 A | 9/1980 | Hohman | |
| 4,394,259 A | 7/1983 | Benny et al. | |
| 4,607,595 A | 8/1986 | Busot et al. | |
| 4,728,438 A | 3/1988 | Featherstone et al. | |
| 4,915,059 A | 4/1990 | Long | |
| 4,966,096 A | 10/1990 | Adey | |
| 5,038,715 A | 8/1991 | Fahs, II | |
| 5,123,195 A | 6/1992 | Hawkins | |
| 5,186,121 A | 2/1993 | Smith, Jr. | |
| 5,317,645 A | 5/1994 | Perozek et al. | |
| 5,385,428 A | 1/1995 | Taft, III et al. | |
| 5,540,521 A * | 7/1996 | Biggs | A01K 63/00 405/74 |
| 5,659,977 A | 8/1997 | Jensen et al. | |
| 5,732,654 A | 3/1998 | Perez et al. | |
| 5,823,142 A | 10/1998 | Cardinale et al. | |
| 5,961,831 A | 10/1999 | Lee et al. | |
| 5,978,315 A | 11/1999 | Moulaug | |
| 5,979,362 A * | 11/1999 | McRobert | A01K 63/10 119/227 |
| 6,000,362 A | 12/1999 | Blyth et al. | |
| 6,041,738 A | 3/2000 | Hemauer et al. | |
| 6,065,430 A | 5/2000 | Sheriff | |
| 6,099,879 A | 8/2000 | Todd, Jr. | |
| 6,206,612 B1 | 3/2001 | Meyer | |
| 6,317,385 B1 | 11/2001 | Hedgepeth | |
| 6,382,134 B1 | 5/2002 | Gruenberg et al. | |
| 6,443,098 B1 | 9/2002 | Blyth et al. | |
| 6,447,681 B1 * | 9/2002 | Carlberg | C02F 3/327 210/219 |
| 6,474,264 B1 | 11/2002 | Grimberg et al. | |
| 6,499,431 B1 | 12/2002 | Lin et al. | |
| 6,722,314 B1 * | 4/2004 | Crisinel | A01K 63/042 119/245 |
| 6,902,675 B2 | 6/2005 | Kelly et al. | |
| 6,932,025 B2 | 8/2005 | Massingill et al. | |
| 6,986,323 B2 | 1/2006 | Ayers | |
| 6,988,394 B2 | 1/2006 | Shedd et al. | |
| 7,001,519 B2 * | 2/2006 | Linden | A01K 63/04 210/906 |
| 7,082,893 B2 * | 8/2006 | Schreier | C02F 3/302 119/260 |
| 7,462,284 B2 | 12/2008 | Schreier et al. | |
| 7,594,779 B2 | 9/2009 | Hildstad et al. | |
| 7,736,509 B2 | 6/2010 | Kruse | |
| 8,117,992 B2 * | 2/2012 | Parsons | A01K 63/00 119/226 |
| 8,141,515 B2 | 3/2012 | Nien | |
| 8,506,811 B2 | 8/2013 | Bradley et al. | |
| 8,535,883 B2 | 9/2013 | Cane et al. | |
| 8,633,011 B2 | 1/2014 | Palmer et al. | |
| 9,637,402 B2 * | 5/2017 | Tal | C02F 11/04 |
| 9,756,838 B2 * | 9/2017 | Kunitomo | C02F 1/76 |
| 10,034,461 B2 * | 7/2018 | Holm | C02F 3/305 |
| 10,131,558 B1 | 11/2018 | Cox, Jr. et al. | |
| 10,338,631 B1 | 7/2019 | Jorden et al. | |
| 10,660,315 B1 | 5/2020 | Alcantar et al. | |
| 10,694,722 B1 | 6/2020 | Holm et al. | |
| 10,748,278 B2 | 8/2020 | Brubacher | |
| 10,959,411 B2 * | 3/2021 | Holm | A01K 61/95 |
| 11,425,895 B2 | 8/2022 | Holm et al. | |
| 11,484,015 B2 | 11/2022 | Holm et al. | |
| 11,596,132 B2 | 3/2023 | Holm | |
| 11,627,729 B2 | 4/2023 | Holm et al. | |
| 11,662,291 B1 | 5/2023 | Holm | |
| 11,785,921 B2 | 10/2023 | Holm | |
| 2003/0059494 A1 | 3/2003 | Ang et al. | |
| 2003/0070624 A1 | 4/2003 | Zohar et al. | |
| 2003/0104353 A1 | 6/2003 | Brielmeier et al. | |
| 2003/0121859 A1 | 7/2003 | Kelly et al. | |
| 2004/0168648 A1 * | 9/2004 | Ayers | A01K 63/04 119/200 |
| 2004/0244715 A1 | 12/2004 | Schreier et al. | |
| 2005/0211644 A1 | 9/2005 | Goldman | |
| 2006/0055934 A1 | 3/2006 | Sunshine et al. | |
| 2007/0221552 A1 | 9/2007 | Denney | |
| 2007/0242134 A1 | 10/2007 | Zernov | |

(56) References Cited

U.S. PATENT DOCUMENTS

| | | | |
|---|---|---|---|
| 2008/0000821 A1* | 1/2008 | Drewelow | C02F 1/20 |
| | | | 210/150 |
| 2008/0223788 A1* | 9/2008 | Rimdzius | C02F 9/00 |
| | | | 202/176 |
| 2009/0145368 A1* | 6/2009 | Brauman | A01K 61/80 |
| | | | 119/224 |
| 2009/0250010 A1 | 10/2009 | Urusova et al. | |
| 2010/0081961 A1 | 4/2010 | Cox | |
| 2010/0092431 A1 | 4/2010 | Liles et al. | |
| 2010/0236137 A1* | 9/2010 | Wu | C11C 3/003 |
| | | | 554/8 |
| 2010/0269761 A1* | 10/2010 | Nien | A01K 63/04 |
| | | | 119/261 |
| 2011/0046603 A1 | 2/2011 | Felsovalyi et al. | |
| 2011/0060533 A1 | 3/2011 | Jorden et al. | |
| 2011/0168616 A1 | 7/2011 | Robertson et al. | |
| 2011/0250604 A1 | 10/2011 | Cane et al. | |
| 2011/0258915 A1 | 10/2011 | Subhadra | |
| 2012/0103271 A1 | 5/2012 | Kong | |
| 2012/0125940 A1 | 5/2012 | Wright et al. | |
| 2012/0184001 A1 | 7/2012 | Stephen et al. | |
| 2013/0098303 A1 | 4/2013 | Jones | |
| 2013/0273599 A1 | 10/2013 | Robitaille et al. | |
| 2013/0319342 A1 | 12/2013 | Musser | |
| 2013/0327709 A1* | 12/2013 | Stroot | C02F 3/2893 |
| | | | 210/151 |
| 2014/0261213 A1 | 9/2014 | Stiles, Jr. et al. | |
| 2014/0293040 A1 | 10/2014 | Hietaniemi | |
| 2015/0167045 A1 | 6/2015 | Brubacher | |
| 2015/0230439 A1 | 8/2015 | Harwood | |
| 2015/0250113 A1* | 9/2015 | Shoham | C12M 23/18 |
| | | | 47/62 R |
| 2015/0256747 A1 | 9/2015 | Grotto et al. | |
| 2015/0342161 A1 | 12/2015 | Sheriff | |
| 2015/0347817 A1 | 12/2015 | Valvik et al. | |
| 2015/0366173 A1 | 12/2015 | Myers | |
| 2016/0356756 A1 | 12/2016 | Covi | |
| 2017/0260546 A1 | 9/2017 | Qimron et al. | |
| 2017/0299382 A1 | 10/2017 | Yang et al. | |
| 2018/0125041 A1* | 5/2018 | Holm | A01K 63/045 |
| 2019/0008126 A1 | 1/2019 | Shishehchian | |
| 2019/0071336 A1 | 3/2019 | Greenwald et al. | |
| 2019/0082661 A1 | 3/2019 | Lahav et al. | |
| 2019/0135393 A1 | 5/2019 | Pieterkosky | |
| 2019/0141964 A1 | 5/2019 | Perslow et al. | |
| 2019/0169046 A1 | 6/2019 | Holm | |
| 2019/0200584 A1 | 7/2019 | Holm | |
| 2020/0396970 A1 | 12/2020 | Holm et al. | |
| 2021/0127646 A1 | 5/2021 | Holm | |
| 2021/0137082 A1 | 5/2021 | Holm | |
| 2021/0195874 A1 | 7/2021 | Holm et al. | |
| 2021/0227807 A1 | 7/2021 | Holm et al. | |
| 2021/0235010 A1 | 7/2021 | Wallace et al. | |
| 2021/0274758 A1 | 9/2021 | Holm et al. | |
| 2021/0275604 A1 | 9/2021 | Holm | |
| 2021/0278378 A1 | 9/2021 | Holm | |

FOREIGN PATENT DOCUMENTS

| | | |
|---|---|---|
| GB | 2464686 | 4/2010 |
| JP | H01112935 | 5/1989 |
| WO | WO200241703 | 5/2002 |
| WO | WO2006042371 | 4/2006 |
| WO | WO2008094132 | 8/2008 |
| WO | WO2016154602 | 9/2016 |
| WO | WO2017002081 | 1/2017 |
| WO | WO017153986 | 9/2017 |
| WO | WO2018184029 | 4/2018 |
| WO | WO2018169412 | 9/2018 |
| WO | WO2021150873 | 7/2021 |
| WO | WO2021162847 | 8/2021 |
| WO | WO2021178080 | 9/2021 |
| WO | WO2021178431 | 9/2021 |
| WO | WO2021216225 | 10/2021 |
| WO | WO2021221745 | 11/2021 |

OTHER PUBLICATIONS

Guttman et al., Guttman et al. (Aquaculture, 2008; 279; 85-91), Mar. 26, 2008.

Van Der Heile Tony et al., Composition, Treatment and Use of Saline Gorundwater for Aquaculture in the Netherlands, World Aquaculture, Jun. 2014, pp. 23-27, Nov. 2014.

Garcia-Bencochea, Jose I. et al., Deep Well Disposal of Waste Waters in Saline Aquifers of South Florida, Abstract, American Geophysical Union Water Resources Research, Oct. 1970, 1 page, Oct. 1970.

Howard, Mark R., Down the Drain, Florida Trend, Jan. 1, 2000, hhtp://www.floridatrend.com/print/article/13274, 2 Pages, Jan. 1, 2000.

Gorman J. et al., Economic Feasibility of Utilizing West Alabama Saline Ground Water to Produce Florida Pompano and Hybrid Striped Bass in a Recirculating Aquaculture System, Alabama Agricultural Experiment Station, Auburn University, 19 Pages, Dec. 1, 2009.

Sharrer, Mark J. et al. Evaluation of Geotextile Filtration Applying Coagulant and Flocculant Amendments for Aquaculture, biosolids dewatering and phosphorus removal, Aquacultural Engineering, vol. 40, Issue 1, Jan. 2009, 10 Pages, <URL:https://www.sciencedirect.com/science/article/pii/S0144860908000678> (Accessed Dec. 4, 2017), Jan. 1, 2009.

Haberfeld, Joseph, Letter RE First Request for Additional Information (RAI), Florida Department of Environmental Protection, 6 pages, Jun. 4, 2013.

Storro, Gaute, Investigations of Salt groundwater at Akvaforsk Research Institute, Sunndalsora, Norway, Geological Survey of Norway, NGU-rapport 93.029, 1993, 11 pages, Jan. 1, 1993.

Milchman, Jon, Construction Clearance Permit Application, Florida Department of Environmental Protection, (FDEP), 5 pages, May 12, 2013.

Sun Min et al., Models for estimating feed intake in aquaculture, a review, abstract, Computers and Electornics in Agriculture, vol. 127, <URL:http://www.sciencedirect.com/science/article/pii/S0168169916304240> (Accessed Dec. 4, 2017), 4 pages, Sep. 2016.

South Dade News Leader, Homestead, Notice of Draft Pemit, Miade-Dade County, Florida, Sep. 13, 2013, 1 Page, Sep. 13, 2013.

South Dade News Leader, Notice of Intent, Homestead , Miade-Dade County, Florida, Oct. 18, 2013, 1 page, Oct. 18, 2013.

Florida Department of Environmental Protection, Notice of Permit, 8 pages, Nov. 4, 2013.

Hoefel et al., Cooperative biodegradation of geosmin by a consortium comprising three gram-negative bacteria isolated from the biofilm of a sand filter column. Letters in Applied Microbiology, 43, pp. 417-423, Jan. 1, 2006.

Jonns et al., Streptophage-Mediated Control of Off-Flavour Taint Producing Streptomycetes Isolated From Barramundi Ponds, Apr. 12, 2017.

Lindholm-Lehto et al., Depuration of Geosmin and 2 mehtylisoborneol-induced off-flavors in recirculation aquacultre system (RAS) farmed European whitefish Coregonus lavaretus, Jul. 10, 2019.

McDowall et al., Enhancing biofiltration of geosmin by seeding sand filter columns with a consortium of geosmin degrading bacteria. Water Research, 43, pp. 433-440, Jan. 1, 2009.

Sompong et al., Microbial Degradation of musty odor in aquaculture pond, International Journal of Agricultural Technology, Dec. 1, 2018.

Tucker et al., Managing Off-Flavor Problems in Pond-Raised Catfish, SRAC Publication, Oct. 5, 2018.

Bergur Andreasen, https://www3.wipo.int/designdb/hague/en/showData.jsp?SOURCE=HAGUE&KEY=D205963, Mar. 27, 2020.

Small, Brian et al., On the Feasibility of Establishing a Saline Aquaculture Industry in Illinois, Illinois Sustainable Technology (56) References Cited

OTHER PUBLICATIONS

Center [online] <URL:http://www.istc.illinois.edu/info/library_docs/TR/TR051.pdf>, 46 Pages, Mar. 2014.
Akva Group, Recirculation Systems, 6 pages, <URL:http://www.akvagroup.com/products/land-based-aquaculture/recirculation systems> (Accessed Dec. 4, 2017).
State of Florida, Well Completion Report, Feb. 2015, 23 Pages, Feb. 2015.
Water Source, University of Alaska, Fairbanks, School of Fisheries & Ocean Sciences, 53 Pages, <URL:hhtps://www.sfos.uaf.edu/fitc/teaching/courses/fish336/materials/FISH%20336%20Letc%2031%20Water%20Quality%203.pdf> (Accessed), Dec. 4, 2017.

\* cited by examiner

TRANSFER ASSEMBLY AND SYSTEM FOR AQUACULTURE

CLAIM OF PRIORITY

This application is a Continuation of U.S. patent having Ser. No. 16/990,597, which was filed on Aug. 11, 2020, which is maturing into U.S. Pat. No. 11,627,729 and issuing on Apr. 18, 2023, which claims benefit to U.S. Provisional Patent Application having Ser. No. 63/014,387, filed on Apr. 23, 2020. Additionally, U.S. patent having Ser. No. 16/990,597 is a Continuation-in-Part of U.S. patent having Ser. No. 16/990,271, which was filed on Aug. 11, 2020, and which matured into U.S. Pat. No. 11,596,132 which issued on Mar. 7, 2023, and which claims benefit to a U.S. Provisional Patent Applications having Ser. No. 62/975,410, filed on Feb. 12, 2020. Additionally, U.S. patent having Ser. No. 16/990,271 is a Continuation-in-Part of U.S. patent having Ser. No. 16/916,986, which was filed on Jun. 30, 2020, and which matured into U.S. Pat. No. 11,484,015 which issued on Nov. 1, 2022, and which is a Continuation-in-Part of U.S. Patent having Ser. No. 15/867,100 which was filed on Jan. 10, 2018, which matured into U.S. Pat. No. 10,034,461 and issued on Jul. 31, 2018, which was a Continuation of U.S. patent having Ser. No. 15/157,296 which was filed on May 17, 2016, which matured into U.S. Pat. No. 10,694,722 and issued on Jun. 30, 2020, which claims benefit to Provisional Applications having Ser. No. 62/165,144 filed on May 21, 2015. Each of the above applications are incorporated by reference herein in their entirety.

BACKGROUND OF THE INVENTION

Field of the Invention

The present invention is directed to a transfer assembly and system associated with an aquaculture system operative for the transfer of marine life between storage facilities, wherein the plurality of storage facilities are disposed and structured to contain and develop marine life at different stages of growth.

DESCRIPTION OF THE RELATED ART

Currently, there is a recognized alarming decline in conventional fisheries, which in turn is based on overfishing and harmful environmental happenings. At present, the demand for seafood exceeds the supply available from such conventional fisheries and it is predicted that with an increased world population, the demand for seafood will double in the immediate future. Accordingly, the inability of conventional fisheries to meet such an increasing demand for seafood has resulted in an equally increasing need for aquaculture systems or "fish farms" capable of significantly high volume of seafood production. In at least some instances, systems of this type are physically located in a geographical location having direct access to sea water. In turn, this may have a derogatory effect on the environment in the form of pollution of coastal areas.

Accordingly, present technology of aquaculture systems provides for the raising of various fish species such as, but not limited to, Atlantic salmon in sufficient quantities and at expected quality levels to overcome the problems of the type set forth above. In doing so, various combinations of oxygenation, degassing, particulate removal, bio-filtering, sanitizing, flocculation, and denitrification may be employed. Moreover, in aquaculture systems of the type referred to including, but not limited to, recirculating aquaculture systems (RAS), eggs may be obtained from an external supplier which are then processed and developed over an extended period of time. As such, aquaculture systems of the type referred to may include one or more production lines to assure biosecurity and the possibility of producing under different standards in each. The specifications, in terms of number of tanks, volumes, flow rates etc. may vary for the different systems and/or production lines involved.

As such, aquaculture systems and/or RAS facilities of the type referred to herein can comprise a plurality of tanks, containers, etc. to maintain and process the fish/marine life during the extended developmental period. During such development, the fish are transferred between such developmental stages including the tanks, containers, etc. associated there with. However, care must be taken in order to maintain appropriate and preferred environmental conditions during the entire developmental process. Maintaining the preferred and intended environmental conditions facilitates proper development of the processed marine life, at least in terms of size, flavoring, etc. One such environmental factor may be the maintenance of the temperature of the containment water as well as the marine life contained therein. Maintenance of proper temperature may be of particular concern due to the fact that such aquaculture systems, including the plurality of different tanks, containers, etc. associated therewith, may be extremely large and be disposed in spaced relation to one another, even when such systems are located in a substantially common geographical area. Therefore, in terms of maintaining effective environmental standards, the transferring of the marine life between the different tanks, based on their stages of development may be problematic.

Accordingly, there is a need in the industry associated with aquaculture systems, including recirculating aquaculture systems, for a system for transferring marine life between a plurality of storage facilities typically in the form of, but not limited to, various sized tanks. Such tanks or storage facilities are structured to maintain containment water appropriate for the growth stage of the marine life being contained and/or transferred. Further, such a preferred and proposed transferring system may include a transfer assembly comprising and or defining a path of fluid flow interconnecting successively communicating ones of the plurality of storage facilities in fluid communication with one another. Such a proposed transfer assembly will facilitate the movement of the marine life between the successively communicating storage facilities, when the marine life is ready for development at a different, succeeding stage of growth.

Also, the proposed transfer assembly is disposed and structured to facilitate maintenance of the preferred and required environmental conditions by disposing at least a majority of a length of the path of fluid flow between successively communicating ones of the plurality of storage facilities beneath independent ground levels on which the different storage facility/tanks are located. Disposition of the one or more paths of fluid flow in such a location serves to facilitate maintenance of the temperature of the containment water and or marine life disposed along the one or more paths of fluid flow. Such maintenance of intended environmental conditions, specifically including temperature, is due at least in part to the shielding or insulating of the path of fluid flow from ambient weather conditions located at or above ground level on which the plurality of storage facilities are disposed. The subsurface location of the path of fluid flow is also disposed out of heat transferring relation to a proximate water table, aquifers and/or subsurface water saturated soil, and order to avoid heat transfer therebetween.

Yet another factor to be considered for the successful operation of commercial fish farms is the process of harvesting the fish at the appropriate time, when the fish/marine life have reached an appropriate size. Prior art harvesting systems and/or techniques have involved the movement of large quantities of fish through open waters using large cages, nets, etc. In addition, the potential trauma of transferring volumes of marine life in this manner may result in stressful trauma to the fish. Also, harvesting methods or processes involving such a largescale transfer may have the disadvantage of creating significant pollution from the quantity of fish/marine life being transferred. Such pollution will have the tendency to be transferred directly to the open water in which the fish/marine life are held and/or moved stored, etc. In addition, such known or conventional harvesting techniques may frequently require the harvesting of the entire volume of marine life being transferred and/or stored. As a result, it may be difficult or impossible to practically harvest a lesser quantity of fish, which better accommodates the actual consumer demand therefore.

Therefore, there is additional need in the aquaculture industry for "on-demand" harvesting system, which in turn may be operatively associated with an appropriate assembly and system for transferring mature marine life from the one or more systems associated with holding facilities and/or final developmental growth stage, comprising the aquaculture system. As a result, such a preferred and proposed harvesting system/transfer system would facilitate on-demand harvesting of an appropriate quantity of fish/marine life equivalent or appropriate to meet the actual demand for such fish/marine life. Also, such an improved harvesting/transfer system and/or assembly would eliminate the necessity of large-scale transfer thereof, through open waters as well as the illumination of pollution to such open water environments.

SUMMARY OF THE INVENTION

The present invention is directed to the transferring of marine life between different storage facilities in an aquaculture system or facility including, but not limited to a recirculating aquaculture system (RAS). In more specific terms, the marine life including various species of fish may be transferred between successively communicating storage facilities based, at least in part, on the different stages of growth to which the marine life or fish must be exposed in order to reach a harvesting stage or size. However, for purposes of clarity, a non-limiting example of the species of fish/marine life with which the various embodiments of the assembly and systems may be applicable, will be Atlantic salmon. However, due to the fact that different species of fish may also be processed in the manner described in the various embodiments of the present invention the terms "fish" and "marine life" will be used interchangeably.

In more specific terms, a plurality of storage facilities are included in the aquaculture system, each being structured to include containment water for the marine life. Further the containment water and the marine life are maintained at or within a predetermined temperature range to facilitate development and growth, while maintaining a desirable flavor in the marine life when eventually harvested. It is noted that the term "storage facility" may typically comprise a tank or like container in which the marine life is maintained for a predetermined period of time depending upon the developmental growth stage for which the storage facility/tank is intended. As such, the plurality of storage facilities/tanks may vary in structure, dimension and resulting volume of containment water maintained therein. It is also recognized that each developmental growth stage of may involve the processing of extremely large number of fish and as such a plurality of storage facilities/tanks may define each developmental growth stage of processing.

By way of a non-limiting example in the described aquaculture system incorporating the transfer assembly and system of the present invention may comprise an RAS and using non-limiting example of Atlantic salmon as the species of fish being processed, Roe are placed in the hatchery and hatched. When the resulting fingerlings are ready, they will be moved to the fry tank and start feeding. Start feeding tanks may be appropriate for marine life including a size in 0.12 grams to 0.14 grams, wherein the size out is preferably three grams. The amount of time in this developmental stage of the system is up to 2.5 to 3 months). Based on the volume of marine life being developed, these start feeding tanks may comprise a plurality of tanks that are generally about one meter deep. Storage facilities or tanks having different dimensions than those stated are also efficient to operate for start feeding stage.

The fish are grown up to three grams in size and transferred and graded to the Parr tanks. When transferred they are graded a first time. Parr tanks include marine life having a size in of 3 grams and they size out 20 grams. The time involved in this growth stage of the system is up to 2.5 to 3 months. The marine life stay in the Parr tanks until they are 20 grams and then they are transferred to smolt tanks. The marine life are graded in this transfer as well. Smolt tanks are adapted to receive and process marine life having a size in of 20 g and a size out 70 g. The developmental time of this growth stage of the system is up to 3 months. When the marine life reach 70 grams they are transferred to the post smolt system.

Post Smolt tanks are structured to process marine life having a size in 70 g and a size out of 200 g. The developmental time in this growth stage of the system time in system is up to 3 to 5 months. Subsequently, at 200 to 300 grams in size, the marine life are transferred to the on-growing systems. On-growing systems and/or tanks involve marine life having a size in of 200 g and a size out 5250 g. Time involved in this developmental stage of the system may be up to 12 months. The fish may be typically held in these tanks for up to 32 weeks. The final weight in is 1.9 kg. This process may take six months so as to leave an extra buffer in the production system. The fish will be graded upon transfer and eventually transferred to the on growing tanks. The fish can be held in up to 24 weeks. The final weight in the tanks is 5.25 kg. The on growing tanks may be operated on a flow through basis to remove any potential off-flavor from the fish. In addition, one or more tanks may be maintained for the containment of fish for a period of time in order to remove off flavor.

Accordingly, it is apparent that in the maintenance and processing of marine life through different developmental stages, including growth stages, involves the transfer of the marine life between the storage facility tanks associated with each of the developmental and/or growth stages is a factor. Further, it is equally necessary to maintain proper environmental conditions to which the storage facilities/tanks and marine life are disposed. Such environmental conditions specifically include, but are not limited to, temperature.

By way of example, the temperature range at least some of the storage facility/tanks, at different ones of the developmental growth stages and marine life, may be in the range of generally about 14° C. Therefore, it is desirable to maintain the same temperature range of the marine life during the transfer process between the storage facility/tanks associated with the different developmental stages.

In light of the above, the system of the present invention is directed to the transferring of marine life within an aquaculture facility which could include, but not be limited to, a recirculating aquaculture system or facility. Accordingly, the system of the present invention includes a plurality of storage facilities each including containment water for marine life which is maintained within a predetermined temperature range. As also indicated above, the plurality of storage facilities/tanks are structured to maintain the processed marine life at different developmental stages including growth stages. Further, each developmental/growth stage may comprise a plurality of the storage facilities/tanks, based at least in part on the large volume of marine life being processed over a given developmental period of time.

Also, the plurality of storage facilities/tanks may be spaced and/or segregated from one another, such as being located in different buildings, shelters, etc. As indicated, aquaculture systems of the type referred to herein may be extensive. As a result, while the referred to aquaculture system may be located in the same location within a common geographical area, the one or more storage facilities/tanks associated with each developmental growth stage (hatchery, Parr tanks, smolt tanks, post smolt tanks, on growing tanks, etc.) may be built, disposed and located on independent ground surface levels. It is further noted that the individual storage facilities may also be disposed on appropriate supporting foundations such as, but not limited to concrete slabs etc., wherein such supporting foundations are formed, constructed, disposed and in turn supported by the aforementioned and further described independent ground levels at different or same heights.

The system of the present invention further comprises a transfer assembly comprising a path of fluid flow interconnecting at least two, but more practically an additional plurality of storage facilities/tanks in successively communicating relation with one another. Also, at least a majority of a length of the path of fluid flow defining the transfer assembly is disposed beneath the independent ground levels between the communicating storage assembly/tanks at a predetermined depth. The predetermined depth is sufficient to substantially maintain the path of fluid flow within the predetermined temperature range by virtue of not exposing the path of fluid flow to the above ground ambient weather conditions.

The transfer assembly and/or portions thereof which define the path of fluid flow may be in the form of one or more conduits, pipes, etc. dimensioned to transfer a predetermined and/or appropriate volume of containment water and marine life between at least two but more practically a greater number of the plurality of successively communicating storage facilities. As clearly indicated, the transfer of the marine life will be based at least in part on the different developmental/growth stages to which the marine life must be exposed to reach a size and quality appropriate for harvesting.

Moreover, in order to substantially maintain the containment water and marine life within the preferred, predetermined temperature range the predetermined depth at which the path of fluid flow is located is further disposed at a spaced distance from and/or above a water table which is proximate to the path of fluid flow. Such a spaced distance from the water table or aquifer should be sufficient to eliminate or at least minimize heat transfer from the water table, aquifer and water associated therewith, to the path of fluid flow and the containment water/marine life passing there through.

For purposes of clarity, it is generally recognized that the water table is the upper surface of a saturated zone, where the subsurface ground level is saturated with water. Further, the water table is a surface where the water pressure head is equal to the atmospheric pressure and may be visualized as the surface of the subsurface materials that are saturated with groundwater. It is also recognized that groundwater may be from precipitation or from groundwater flowing into an aquifer. In areas with sufficient precipitation, water infiltrates the soil, passing through unsaturated zones. In more specific terms and as used herein the water table is a water saturated subsurface and made be directly associated with aquifers in certain geographical regions.

It is further recognized that in certain geographical regions the depth or location of the water table may vary based on seasons. Such seasonal variance may be due to a greater or lesser rainfall, exposure to aquifers or other water sources and other factors. By way of non-limiting example, during a rainy season in a given geographical area, the water table may be raised closer to the normal, original or exposed ground level surface. Therefore, the subsurface depth at which the transfer assembly and path of fluid flow is buried is sufficient to accommodate seasonal variance of the water table, again dependent on the weather and other conditions which may affect the depth or level of a proximate water table.

It is further recognized that in some geographical areas the water table, aquifer or below ground saturated soil is relatively close to the above exposed ground surface level on which the plurality of storage facilities/tanks may be disposed/supported. By way of example, the state of Florida includes a natural aquifer system (Floridan aquifer) as well as a relatively shallow water table located relatively close to the exposed, natural ground surface. Accordingly, in order to maintain the buried transfer assembly and defined path of fluid flow out of heat transferring relation to the water associated with the water table, aquifer system, etc., the one or more storage facilities/tanks defining each of the developmental growth stages of the marine life may be raised above the natural exposed ground surface level to a revised ground level.

Accordingly, as used herein, the term "independent" ground level may refer to the natural or normal, outer exposed ground level on which the plurality of storage facilities are disposed. In contrast, the term "revised" ground level is meant to describe a raised, functionally operative ground level on which the plurality of storage facilities are disposed. As such, the "revised" ground may be built on top of the original "independent" ground level. Further, the "revised" ground level is man-made and constructed to be at least a minimum height above the original normal or "independent" ground level as well as the proximate water table. Further, the "revised" ground level is constructed and operatively utilized in geographical areas where the proximate water table is relatively shallow and/or where the seasonal variance thereof serves to raise the water table to a shallow depth, such as in geographical regions including, but not limited to, Florida, as set forth above.

It is to be further noted that each of the independent ground levels on which the storage facilities are disposed may have a common height or may have different heights relative to the proximate water table. Due at least in part to the fact that the revised ground levels may be built on top of the independent ground levels, the revised ground levels may also have a common height or may differ in height.

Therefore, the revised ground levels on which the storage facilities are positioned, and disposed, physically formed and/or constructed at a raised or predetermined increased height above a corresponding normal, natural and exposed independent ground level. Moreover, the revised ground levels of each of the plurality of storage facilities/tanks should be sufficient to facilitate the disposition of the path of fluid flow at a sufficient predetermined depth concurrent to the path of fluid flow being disposed a predetermined spaced distance above or from an aquifer and or water table, in order to facilitate maintenance of the predetermined temperature of the path of fluid flow.

In establishing an appropriate subsurface disposition of the transfer assembly, including the path of fluid flow, between the ground level and the water table, aquifer, etc. reference will be made to a recognized standard specifically including the North American Vertical Datum of 1988 (NAVD 88). In more specific terms, NAVD 88 is the vertical datum for orthometric heights established for vertical control surveying in the United States, based on the General Adjustment of the North American Datum of 1988. NAVD 88 was affirmed in 1993 as the official vertical datum in the National Spatial Reference System (NSRS) for the contiguous United States and Alaska. Further, the NAVD 88 comprises a leveling network on the North American Continent, ranging from Alaska through Canada, across the United States, being affixed to a single origin point on the continent. In defining the NAVD 88, is it is calculations are involved for the location of the local Mean Sea Level (MSL).

It is further recognized that the NAVD 88 will be replaced with a new geometric reference frame and Geo potential datum and 2022. Such new reference frames will rely primarily on global navigation satellite systems (G and SS) such as the Global Positioning System (GPS) as well as other gravimetric models. However, as at least one point of reference, to be described in greater detail hereinafter the NAVD 88 will be used as represented in detail hereinafter.

Yet additional embodiments of the present invention are directed to on-demand harvesting of marine life. Moreover, the various additional embodiments also include a system and/or assembly for transferring marine life within or from an aquaculture facility, of the type described above, and or be operatively independent thereof. Accordingly, the operatively combined transfer assembly and harvesting facility may be considered a part of an aquaculture facility, including a recirculating aquaculture system, or be independent thereof.

In more specific terms, this invention includes a system for transferring marine life from a storage facility which include containment water adequate for the marine life contained therein. Further, the storage facility includes a holding facility structured for containment of water and mature marine life, which is ready for harvesting. In addition, a harvesting facility is structured to harvest the marine life and a transfer assembly connects the holding facility to the harvesting facility and is dimensioned and structured to transfer a predetermined volume of mature marine life from the holding facility to the harvesting facility.

Another advantage of the transfer facilities and system of the present invention is the ability to maintain quality control standards throughout the recirculating aquaculture system (RAS) operatively associated with the transfer system. Moreover, quality of the marine life eventually harvested can be assured, through selected and/or predetermined sampling of the marine life, once it reaches the harvesting facility, subsequent to the successive transferring between the various stages of growth via the successively communicating storage facilities. Such sampling allows the preservation of data integrity in the recirculating aquaculture system without introducing outside variables. This is due at least in part to the fact that the successive transfer of marine life from the RAS, through the storage facilities, to the harvesting facility occurs successively and on demand. The aforementioned sampling can be performed for a variety of quality control issues relating to the of the harvested marine life. Such issues include, but are not limited to flavor, size, color, etc. Further the quality control issues being sampled relate directly to the conditions and operative features of the RAS. By way of example, if there is an "off-flavor" it is not a result of the successive transfer of the marine life through the various growth stages to the harvesting facility nor the potential netting trauma to the marine life during the harvesting process. Rather such "off-flavor" or other quality control issues will be due to the operative conditions within the RAS as a whole.

As indicated above, the system and/or assembly of these additional embodiments of the present invention relating to harvesting marine life, may be considered a part of and including a plurality of storage facilities each including containment water and marine life. Such facilities being disposed in successive communication with one another, wherein the plurality of storage facilities are operatively structured to define different developmental and/or growth stages of the marine life being processed. Accordingly, the aforementioned holding facility may include at least one, but more practically a plurality of holding tanks dimensioned and structured to hold mature marine life which has been developed to a specific growth stage or size adequate for harvesting.

Moreover, when associated directly with an aquaculture system of the type set forth above and further described hereinafter, the holding facility may include the one or more on-growing tanks associated with the aquaculture system. In the alternative, the aforementioned holding facility may include one or more holding tanks, in addition to the on-growing tanks, dimensioned and structured to contain mature marine life, ready for harvesting, which are separate from and/or independent of the one or more on-growing tanks associated with the aquaculture system described herein.

In each of the additional preferred embodiments associated with the harvesting process, the aforementioned transfer assembly comprises a path of fluid flow interconnecting the holding facility in fluid communication with the harvesting facility. Moreover, the transfer assembly includes at least one or more conduits, each dimensioned to transfer a predetermined volume of mature marine life from the holding facility to the harvesting facility.

As set forth above and as further described herein, the harvesting process takes place when the fish or marine life reach a mature weight or size. Further, for purposes of clarity the fish/marine life referred to herein use Atlantic salmon as an example. Accordingly, Atlantic salmon and possibly similar species are harvested when they are mature. Therefore, as used herein and again referring to Atlantic salmon as a nonlimiting example "mature fish" or "mature marine life" are harvested when reaching a size of generally about 5.25 kg. However, it is emphasized that when other species of fish are being processed in an aquaculture system the general size/weight thereof may differ from that indicated for Atlantic salmon. However, there are commercially recognized standards for the size/weight of different species of fish/ marine life ready for harvesting and the defining of mature marine life as reaching a size of generally about 5.25 kg is set forth herein by way of nonlimiting example. As also emphasized above and hereinafter in more detail the fish/marine life being processed may reach such a "mature" status either in the on-growing tanks or in a holding facility comprising one or more holding tanks. As also indicated, the on-growing tanks and or the one or more holding tanks may include flow-through capabilities to remove any potential off-flavor from the fish being contained. Therefore, the one or more non-growing and/or holding tanks may be maintained for the containment of mature fish for a predetermined period of time in order to remove off flavor.

While the different embodiments of the assembly and system of the present invention is described as relating to an aquaculture system or facility, the described embodiments are equally applicable for use with a recirculating aquaculture system and the various storage facilities/tanks/developmental growth stages operatively associated therewith.

Accordingly, these and other objects, features and advantages of the present invention will become clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As schematically represented in the accompanying Figures, the present invention is generally represented as 10 and is directed to the transferring of marine life within an aquaculture system, between a plurality of storage facilities 12, 13, 14, 15, etc. based, at least in part, on a stage of growth and/or development of the marine life while being processed. For purposes of clarity, the storage facilities 12-15, etc. each include structures such as, but not limited to, tanks maintaining containment water for the marine life which are adequate in number and dimension to process the marine life during a particular stage of growth and/or development. Also, as used herein the term aquaculture system is meant to include, but not be limited to, a recirculating aquaculture system (RAS).

Figure 1:
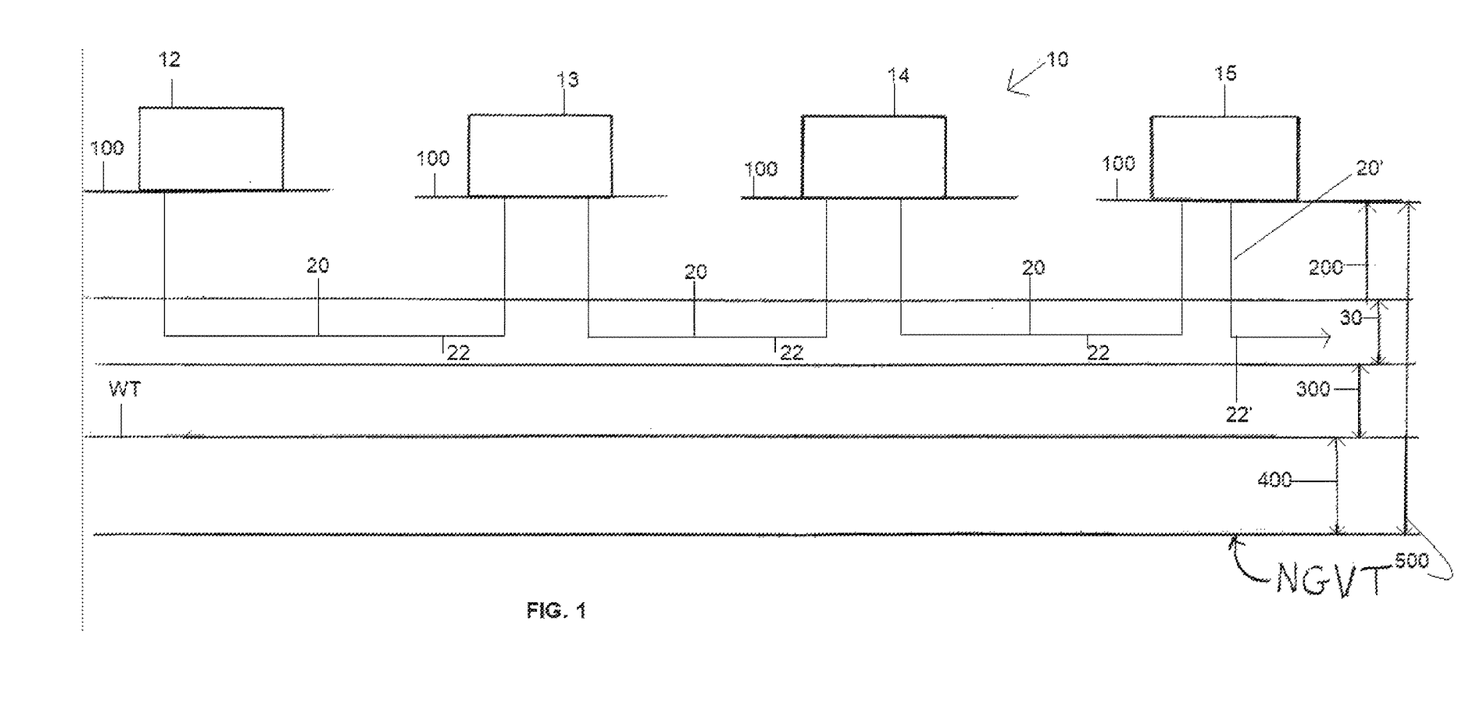
FIG. 1 is a schematic representation of one embodiment of the transfer assembly and system of the present invention including a plurality of storage facilities disposed and supported at independent normal, exposed or natural ground levels of a given geographical area.
Figure 2:
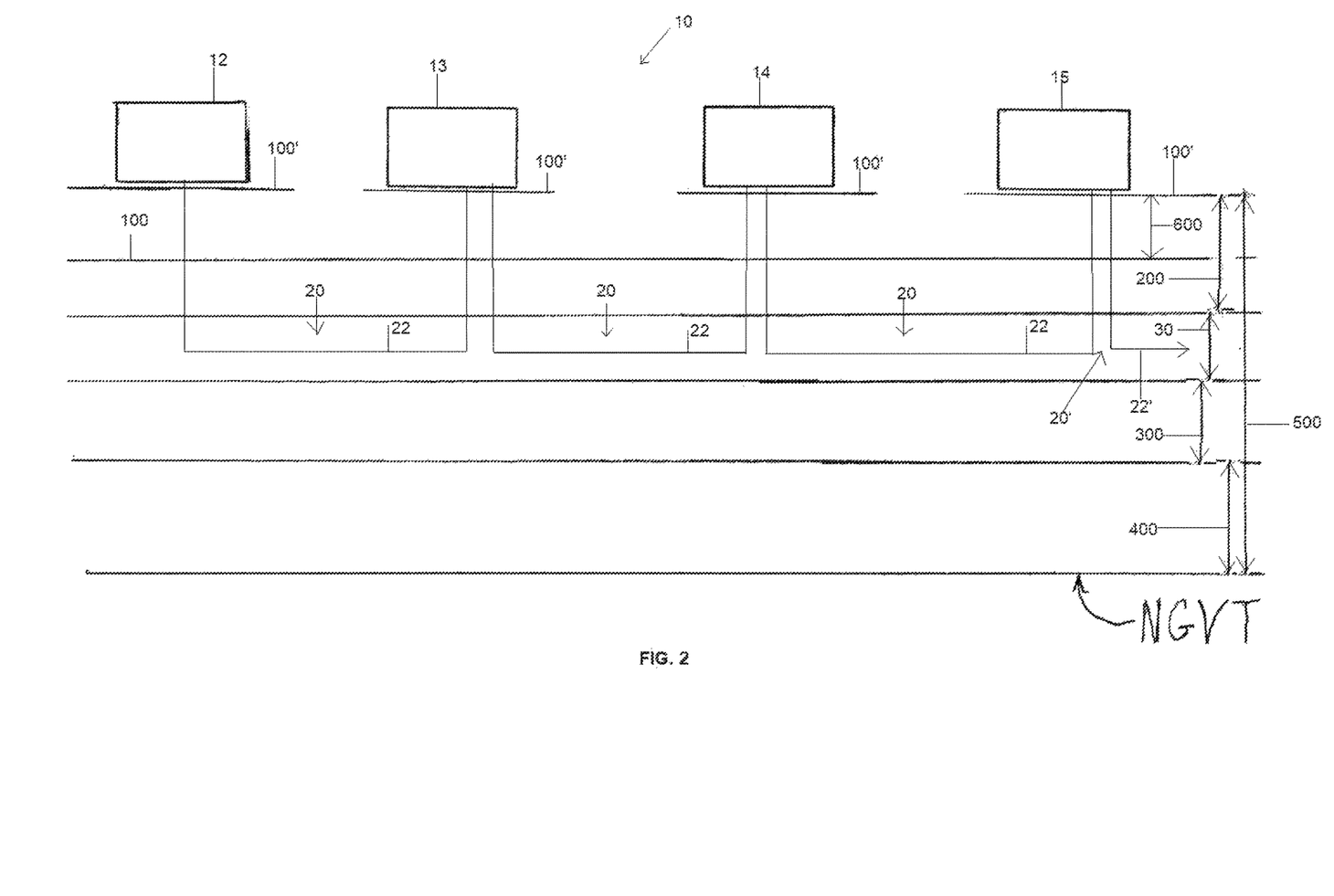
FIG. 2 is a schematic representation of another embodiment of the transfer assembly and system of the present invention including a plurality of storage facilities disposed and supported at revised ground levels, above a normal, exposed or natural ground level of a given geographical area.

Further, in the different embodiments of FIGS. 1 and 2 each of the storage facilities 12-15, etc. may include a single tank or like containment structure or a plurality of such tanks or containment structures dependent, at least in part, on the quantity and/or size of the marine life being processed during respective growth stages. By way of non-limiting example, the plurality of storage facilities/tanks 12-15, etc. could include hatcheries, Parr tanks, smolt tanks, post smolt tanks, growing tanks, etc., each representative of the different stage of growth of the marine life. Also, the plurality of storage facilities 12-15, etc. could vary in number and be used for other developmental processing of marine life, rather than being associated with a specific growth stage as indicated.

Therefore, as represented in both FIGS. 1 and 2, the transfer assembly and/or system 10 of the present invention includes the plurality of storage facilities 12-15, etc. each including containment water for marine life. In order to assure and facilitate proper growth and other processing of the marine life, the containment water within the plurality of storage facilities 12-15, etc. is maintained within a predetermined temperature range. Such predetermined and/or preferred temperature is in the range of about 14° C. As also indicated above, the plurality of storage facilities/tanks 12-15, etc. maintain the marine life at different stages of growth, wherein each developmental growth stage may comprise one or more storage facilities/tanks, based at least in part on the volume and size/age of marine life being processed over a given developmental period of time.

Also, the plurality of storage facilities/tanks 12-15, etc. may be spaced and/or segregated from one another, such as being located in different buildings, shelters, housings, etc. As indicated, aquaculture systems of the type referred to herein may be extensive, again based at least in part on the volume of marine life being processed over a comparatively long developmental time period. As a result, while the aquaculture system may be located in the same location within a common geographical area, the one or more storage facilities/tanks 12-15, etc. associated with each developmental growth stage (hatchery, Parr tanks, smolt tanks, post smolt tanks, growing tanks, etc.) may be built, supported, disposed and located on, different independent ground levels 100, as represented in FIG. 1 or revised ground levels 101', as represented in FIG. 2. Moreover, the different, independent ground levels 100 may be the same height or different heights due at least in part to the segregated disposition of the storage facility/tanks 12-15, etc. similarly, in the embodiment of FIG. 2 the ground levels 100' may be the same height or different heights.

As set forth herein, it is emphasized that the term "independent ground level", as at 100, may refer to the natural or normal outer, exposed ground level, at a geographical location, on which the plurality of storage facilities 12-15, etc. are disposed. In contrast, the term "revised ground level" as at 100', is meant to describe an operative ground level, at a given geographical location, on which the plurality of storage facilities 12-15 etc. are disposed and which is man-made and/or constructed to be at least a minimum height above the original normal or "independent ground level" 100. As such, the "revised ground level" 100' is constructed, formed and operatively utilized in geographical areas where the proximate water table is relatively shallow and/or where the seasonal variance thereof serves to raise the water table to a shallow depth such as in, but not limited to, geographical regions such as Florida, as set forth above.

As also represented in FIGS. 1 and 2, the assembly and/or system 10 of the present invention further comprises a transfer assembly generally indicated as 20 comprising a path of fluid flow 22, both of which are schematically represented, interconnecting successively communicating ones of the plurality of storage facilities/tanks 12-15, etc. in fluid communication with one another. As indicated, the path of fluid flow 22 may extend between two successively communicating storage facility/tanks, such as at 12 and 13. In the alternative, the path of fluid flow 22 may be accurately described herein as including one or more different fluid flow paths extending between different ones of the successively communicating storage facilities/tanks, such as between 12-13, 13-14, 14-15, etc. further, conduits, pipes or like structures may define the path of fluid flow 22 as being operatively associated with the transfer assembly 20.

With further reference to FIGS. 1 and 2, at least a majority of a length of the path(s) of fluid flow 22 defining the transfer assembly 20 is disposed beneath the independent ground levels 100 and 100', between the successively communicating storage assembly/tanks 12-13, 13-14, 14-15, etc. at a predetermined minimum depth 200. The predetermined minimum depth 200 is preferably in the range of 3 feet-4 feet and is sufficient to facilitate the maintenance of the path of fluid flow 22 within the predetermined temperature range of generally about 14° C. This is due to the fact that the path(s) of fluid flow 22 are not exposed to the sun or other above ground weather conditions.

As indicated, the transfer assembly 20 and/or portions thereof which define the path(s) of fluid flow 22 may be in the form of one or more conduits, pipes, etc. dimensioned to transfer a predetermined volume of containment water and marine life successively between the plurality of storage facilities 12-15, etc., based on the different growth stages of the marine life being transferred. By way of non-limiting example, the conduits, pipes, etc. defining the path(s) of fluid flow 22 may have a diameter in the range of about 8 inches to about 30 inches. The smaller diameter conduits, pipes, etc. defining the path(s) of fluid flow 22 may be used to transfer an appropriate volume of containment water and included marine life, wherein the marine life will be smaller in size by virtue of being in an early growth stage. In contrast, the larger diameter conduits, pipes, etc. may be utilized to transfer containment water and included marine life which are larger and/or at a size appropriate for harvesting.

Accordingly, with continued reference to FIGS. 1 and 2, the subsurface area generally indicated as 30 represents the location in which the different size conduits, pipes, etc. (schematically represented) defining the path(s) of fluid flow 22 are located. This subsurface area 30 should be properly located below the independent ground level 100 and/or revised ground level 100', as described in greater detail hereinafter and should be sufficient in size, such as in the range of generally about 2½ feet, to accommodate the different sizes of the conduits, pipes, etc., having a preferred diameter of generally between 8 inches to 30 inches, which define the path(s) of fluid flow 22.

In order to further facilitate maintenance of the containment water and marine life within the preferred, predetermined temperature range of generally about 14° C., while in and traveling along the path(s) of fluid flow 22, the predetermined depth 200 (generally about 3 feet to 4 feet) at which the location area 30 of the path(s) of fluid flow 22 is located, is further disposed at a spaced distance 300 from and above a local water table WT. Such a spaced distance 300 from the water table WT is preferably in the range of at least 2½ to 3 feet. While the spaced distance of the transfer assembly 20 from the water table WT may vary, such distance 300 should be sufficient to eliminate or at least minimize heat transfer from the water within an at least partially defining the water table WT to the containment water and marine life in the path(s) of fluid flow 22.

In establishing an appropriate disposition of the transfer assembly 20, including the path(s) of fluid flow 22, between each of the ground levels 100, 100' and the water table WT, aquifer, etc., reference will be made to a recognized standard including the North American Vertical Datum of 1988 (NAVD 88). In defining the NAVD 88 calculations are involved for the location of the local Mean Sea Level (MSL). As set forth in greater detail herein above.

Accordingly, the embodiment of FIG. 1 represents an implementation of the transfer system 10 of the present invention in a geographical area where the water table WT is normally, historically or typically located a sufficient distance below the natural, exposed ground surface, defined herein as the independent ground level 100. In such a geographical location, the depth of the water table WT is sufficient to maintain the transfer assembly 20 and path(s) of fluid flow 22 a sufficient distance 200 below the independent ground levels 100 and above the water table WT, in order to facilitate maintenance of the path(s) of fluid flow 22 within the preferred temperature range of generally about 14° C. In such a geographical location, the water table WT is located at a recognized distance 400, generally in the range of about 3 feet, above the NGVT and further wherein the NGVT is located an appropriate distance 500, generally in the range of at least 11 feet, below the natural, exposed ground surface, defined herein as the independent ground level 100.

The embodiment of FIG. 2 recognizes that in some geographical areas the water table WT, aquifer or below ground saturated soil is relatively shallow and comparatively close to the original or normal, exposed ground surface level 100 on which the plurality of storage facilities/tanks 12-15, etc. are operationally disposed/supported, as in the embodiment of FIG. 1. By way of example, the state of Florida includes a natural aquifer system (Floridan aquifer) as well as a shallow water table WT located in relatively close proximity to the original or normal exposed ground surface 100. Accordingly, in order to maintain the buried transfer assembly 20 and defined path(s) of fluid flow 22 out of heat transferring relation to the water table WT, the plurality of storage facilities 12-15, etc. may be disposed and supported on a raised, exposed ground surface level represented here in as a "revised ground level" 100'.

As such, the raised, revised ground levels 100' may be man-made and constructed, such as by using ground or soil moving equipment or other techniques, so as to be disposed at a predetermined minimum height 600 above a corresponding normal or natural, exposed ground level, which would normally be at a height equivalent to the independent ground level 100. It is recognized that the predetermined minimum height 600 of the revised ground level 100' may vary dependent on a particular geographical area, but in each practical application, the revised ground level 100' of each of the plurality of storage facilities/tanks 12-15, etc. should be sufficient to facilitate the disposition of the path(s) of fluid flow 22 at a sufficient predetermined depth of generally of at least about 2½ feet to 3 feet below the revised ground levels 100'. Concurrently the path(s) of fluid flow 22 and the area 30 in which they are positioned, should be disposed a predetermined spaced distance 300, generally about a predetermined minimum of 3 feet to 4 feet, above a proximate water table WT. Moreover, as also set forth above with regard to the embodiment of FIG. 1, the disposition of the transfer assembly 20 and path(s) of fluid flow 22 will facilitate the maintenance of the predetermined temperature of and within the path(s) of fluid flow 22 at the predetermined temperature of generally about 14° C.

As set forth above with regard to the embodiment of at least FIG. 2, in such a geographical location where the water table WT is relatively shallow, as set forth above, it generally considered to be located at a recognized distance 400 of generally about 7 feet, above the NGVT. Further, the height of the revised ground levels 100' should be such that the NGVT standard is located an appropriate distance 500, generally about 11 feet, below the revised ground level 100'.

It is further noted that while the system of the embodiment of FIGS. 1 and 2 of the present invention is described as relating to an aquaculture system it is equally applicable for use with a recirculating aquifer system and the various storage facilities/tanks operatively associated there with.

Figure 3:
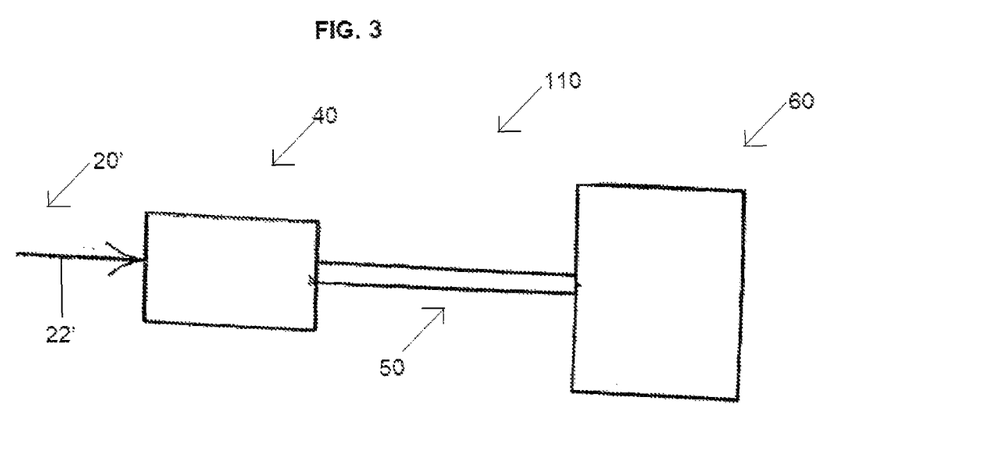
FIG. 3 is a schematic representation of yet another embodiment of the present invention directed to a harvesting facility disposed and structured for use in combination with a transfer assembly, wherein the transfer assembly may be independent of or be at least partially defined by the transfer assembly and system of embodiments of FIGS. 1 and 2.
Figure 4:
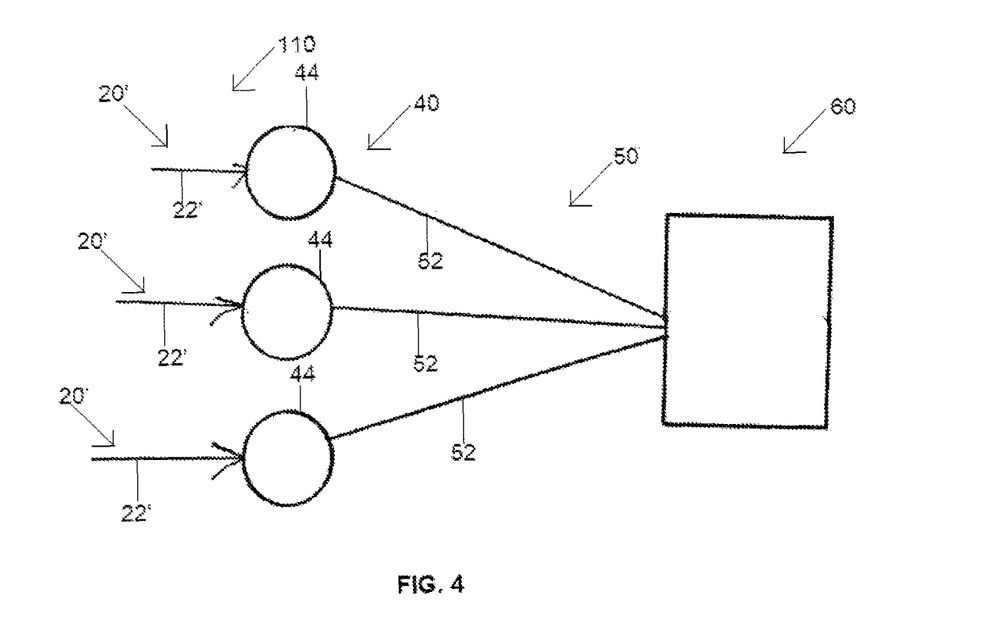
FIG. 4 is a schematic representation of yet another embodiment of the harvesting facility schematically represented in FIG. 3.

As represented in FIGS. 3 and 4, another embodiment of the present invention is directed to a system 110 for transferring marine life within an aquaculture facility which also includes a harvesting facility 60. In more specific terms, the system 110 of this embodiment of the present invention includes a storage facility generally indicated as 40 including containment water and marine life. The storage facility also includes a holding facility, including one or more holding tanks 44.

The holding facility 40 is structured for containment of containment water and marine life and may be operative in combination with the system 10 as represented in the embodiment of FIGS. 1 and 2, for transferring marine life within an aquaculture facility. Further, when used in combination with the system 10 containment water and marine life is transferred there from through a path of fluid flow 20' as represented in FIGS. 1-4. In the alternative, the holdings facility 40 may be used independently of the aquaculture system and facility 10 of FIGS. 1 and 2. When used independently from the embodiment of the system, as represented in FIGS. 1 and 2, the holdings facility 40 may be used in combination with a different system 110 or completely independent of any other aquaculture system.

Therefore, the system 110 for transferring marine life further includes a harvesting facility 60 structured to harvest "mature marine life" which has reached a growth stage acceptable for harvesting and consumption. In addition, a transfer assembly 50 connects the holding facility 40 to the harvesting facility 50, wherein the transfer assembly 50 is dimensioned and structured to transfer a predetermined volume of mature marine life from the holding facility 40 to the harvesting facility 60. As with the embodiments of FIGS. 1 and 2, the system 110 of the present invention may define and operatively describe the transfer assembly 50 as including one or more paths of fluid flow 52 interconnecting the holding facility 40 and/or the one or more holding tanks 44 in fluid communication with the harvesting facility 60. As such, the transfer assembly 50 and has of fluid flow 52 comprise one or more conduits structured to define at least a portion of the paths of fluid flow 52. Further, the transfer assembly 50/52 comprises the one or more conduits disposed and dimensioned to transfer a predetermined volume of mature marine life from the holding facility 40/44 to the harvesting facility 60.

As set forth above and represented in FIG. 4, the holding facility 40 may comprise a plurality of holding containers/tanks 44. In cooperation there with, the transfer assembly 50 may include an appropriate plurality of paths of fluid flow 52 each disposed in fluid interconnecting relation with a corresponding one of the plurality of containers/tanks 44 individually and collectively at least partially defining the holding facility 40. As also clearly indicated in FIG. 4, the transfer assembly 50 may comprise a plurality of conduits, individually defining a respective path of fluid flow 52, disposed and structured to transfer the aforementioned predetermined volume of mature marine life from a different one of the plurality of holding container/tanks 44 to the harvesting facility 60. The versatility of the system 110 of the present invention includes the holding facility 40 and the transfer assembly cooperatively structured for operative, on-demand transfer of the predetermined or selected volume of marine life to the harvesting facility 60. This versatile, operative feature of the system 110 facilitates the on-demand transfer of the different volumes dependent at least in part on the amount or degree of consumer demand for harvested marine life. However, as should be apparent the entire volume of mature marine life may be transferred from the holding facility 40 and/or one or more of a possible plurality of holding container/tanks 44 to the harvesting facility 60 when consumer demand for the harvested marine life so requires.

As emphasized herein, the holding facility 40 and the one or more holding container/tanks 44 may be separate from the on-growing tanks or similar storage facilities 12-15 of the embodiment of FIGS. 1 and 2. When the system 110 of the present invention is used in operative combination with the system 10, a transfer assembly 20' and a path of flow as at 22' may direct marine life and containment water from the last stage of growth in the storage tank, as at 15, to the holding facility 40 and/or one or more holding container/tanks 44. Under such combined operative conditions, the holding facility 40 and/or one or more holding container/tanks 44 will be used in addition to the various stages of growth occurring in tanks 12-15.

However, the operative versatility of the system 110 is further evidenced by the holding facility 40 and the one or more holding container/tanks 44 being defined or replaced by the last stage of growth set forth herein, such as occurring in the on-growing tanks, of the system 10 of the embodiment of FIGS. 1 and 2.

It is further noted that one preferred embodiment of the system 110 of FIGS. 3 and 4 of the present invention is described as relating to and being in operative part of a recirculating aquaculture system 10 (RAS) of the embodiment of FIGS. 1 and 2. However, system 110 is also applicable for use independent of the embodiment of FIGS. 1 and 2 and/or with a recirculating aquaculture system and the various storage facilities/tanks operatively associated therewith.

However, one advantage of incorporating the on-demand transfer system including the embodiment of FIGS. 3 and 4 with an RAS is the ability to maintain quality control standards in the RAS by providing sampling capabilities in the harvesting facility 60, after the marine life has passed through the various growth stages in the storage facilities 12-15 of the system 10. Moreover, quality of the marine life eventually harvested can be assured through selected and/or predetermined sampling of the marine life, once it reaches the harvesting facility 60, subsequent to the successive transferring between the various stages of growth in the storage facilities 12-15. Such sampling allows the preservation of data integrity in the recirculating aquaculture system (RAS) without introducing outside variables, due at least in part to the fact that the successive transfer of marine life from the RAS to the harvesting facility 60 occur successively and on demand. The aforementioned sampling can be performed for a variety of issues relating to the quality of the harvested marine life. Such quality control issues may include, but are not limited to flavor, size, color, etc. Further, the quality control issues being sampled relate directly to the operating conditions in the RAS. By way of example, if the sampling of marine life from the harvesting facility 60 results in the determination of an "off-flavor" it is not a result of the successive transfer of the marine life through the storage facilities 12-15 to the harvesting facility 60 nor the potential trauma to the marine life during the harvesting process. Rather such "off-flavor" or other quality issues, if determined, will be due to conditions within the RAS as a whole.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for transferring marine life within an aquaculture facility, said system comprising:
   a storage facility including containment water and marine life,
   said storage facility including a holding facility,
   said holding facility structured for containment of containment water and mature marine life ready for harvesting,
   a harvesting facility structured to harvest the mature marine life,
   a transfer assembly interposed between said holding facility and said harvesting facility, and
   said transfer assembly dimensioned and structured to transfer a predetermined volume of mature marine life from said holding facility to said harvesting facility and to maintain said predetermined volume of mature marine life fresh for harvesting.

2. The system as recited in claim 1 wherein said transfer assembly comprises a path of fluid flow interconnecting said holding facility in fluid communication with said harvesting facility.

3. The system as recited in claim 2 wherein said transfer assembly comprises at least one conduit structured to define at least a portion of said path of fluid flow.

4. The system as recited in claim 1 wherein said transfer assembly comprises at least one conduit disposed and dimensioned to transfer the predetermined volume of mature marine life from said holding facility to said harvesting facility.

5. The system as recited in claim 1 wherein said transfer assembly comprises plurality of conduits each structured to transfer a predetermined volume of mature marine life from different portions of said holding facility to said harvest facility.

6. The system as recited in claim 1 wherein said holding facility comprises a plurality of containers, said transfer assembly disposed in interconnecting relation with each of said plurality of containers and said harvesting facility.

7. The system as recited in claim 6 wherein said transfer assembly comprises a plurality of conduits each disposed and structured to transfer a predetermined volume of mature marine life from a different one of said plurality of containers to said harvesting facility.

8. The system as recited in claim 1 wherein the predetermined volume comprises a volume less than an entirety of the mature marine life within said holding facility.

9. The system as recited in claim 8 further comprising said holding facility and said transfer assembly cooperatively structured for operative, on-demand transfer of the predetermined volume of mature marine life to said harvesting facility.

10. The system as recited in claim 1 wherein said storage facility, said holding facility and said transfer assembly are included within and at least partially define a recirculating aquaculture facility.

11. The system as recited in claim 10 wherein said transfer assembly is at least partially moveable within the recirculating aquaculture facility.

12. The system as recited in claim 1 wherein said holding facility comprises at least one on growing tank.

13. A system for transferring marine life within an aquaculture facility, said system comprising:
   a plurality of storage facilities each including containment water for marine life,
   said plurality of storage facilities structured for containment of the marine life at different stages of growth,
   said plurality of storage facilities including a holding facility structured for containment of mature marine life ready for harvesting,
   a harvesting facility structured to harvest marine life,
   a transfer assembly comprising a path of fluid flow interconnecting said holding facility in fluid communication with said harvesting facility,
   said transfer assembly dimensioned and structured to transfer a predetermined volume of marine life along said path of fluid flow from said holding facility to said harvesting facility, and
   said transfer assembly being at least partially redirectable.

14. The system as recited in claim 13 further comprising said holding facility and said transfer assembly cooperatively structured for operative, on-demand transfer of the predetermined volume of mature marine life to said harvesting facility.

15. The system as recited in claim 14 wherein the predetermined volume comprises a volume less than an entirety of the mature marine life within said holding facility.

16. The system as recited in claim 13 wherein said holding facility comprises an on-growing tank.

17. The system as recited in claim 13 wherein said transfer assembly comprises at least one conduit disposed and dimensioned to transfer the predetermined volume of mature marine life from said holding facility to said harvesting facility.

18. The system as recited in claim 13 wherein said transfer assembly comprises a plurality of conduits each disposed and structured to transfer a predetermined volume of mature marine life from a different one of a plurality of containers to said harvesting facility.

19. The system as recited in claim 13 wherein said storage facility, said holding facility and said transfer assembly are included within and at least partially define a recirculating aquaculture facility.

* * * * *